June 25, 1946.   J. H. SCAFF   2,402,582
PREPARATION OF SILICON MATERIALS
Filed April 4, 1941   4 Sheets-Sheet 1

INVENTOR
J. H. SCAFF
BY
E. V. Griggs
ATTORNEY

June 25, 1946.  J. H. SCAFF  2,402,582
PREPARATION OF SILICON MATERIALS
Filed April 4, 1941  4 Sheets-Sheet 3

INVENTOR
J. H. SCAFF
BY
E. V. Griggs
ATTORNEY

June 25, 1946.  J. H. SCAFF  2,402,582
PREPARATION OF SILICON MATERIALS
Filed April 4, 1941  4 Sheets-Sheet 4
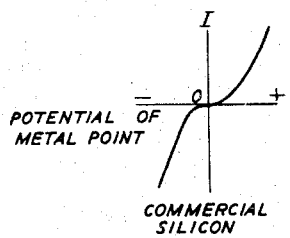
FIG. 10
COMMERCIAL SILICON
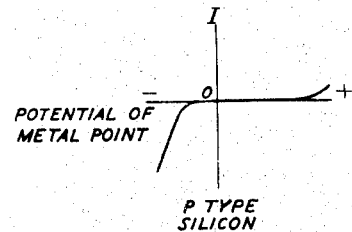
FIG. 11
P TYPE SILICON
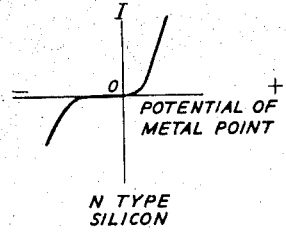
FIG. 12
N TYPE SILICON
FIG. 9
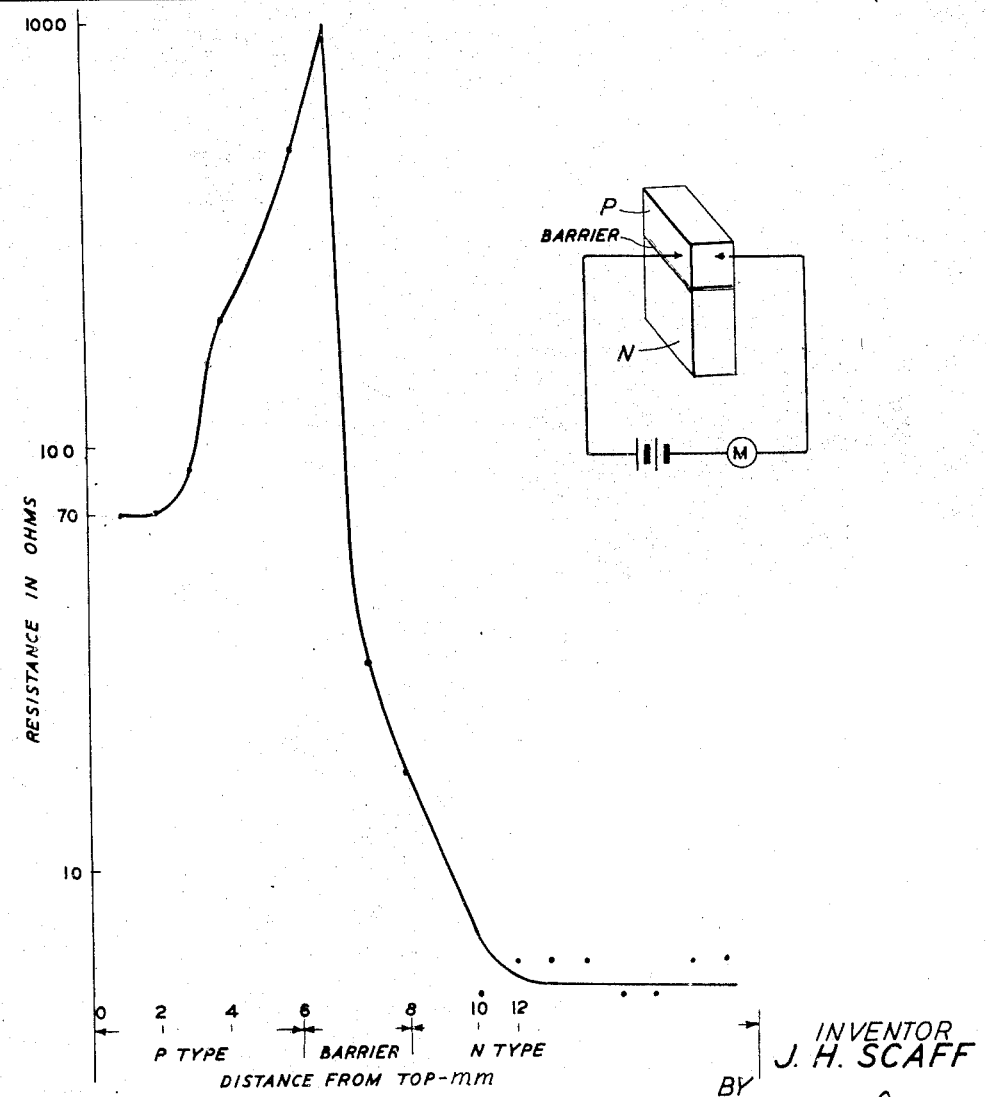
INVENTOR
J. H. SCAFF
BY
E. V. Griggs
ATTORNEY Patented June 25, 1946

2,402,582

UNITED STATES PATENT OFFICE 2,402,582

PREPARATION OF SILICON MATERIALS

Jack H. Scaff, Madison, N. J., assignor to Bell Telephone Laboratories, Incorporated, New York, N. Y., a corporation of New York Application April 4, 1941, Serial No. 386,835

15 Claims. (Cl. 23—223.5)

This invention relates to improvements in the preparation of silicon materials. More particularly, it relates to methods of and apparatus for preparation of highly pure silicon in forms suitable for purposes of modification, rectification or detection of electric currents.

An object of the invention is to facilitate the production of high purity silicon materials in certain physical forms possessing remarkable electrical, thermoelectric, and photoelectric properties.

Another object of the invention is to increase the proportion of silicon material which will have properties of a desired type.

An additional object of the invention is to produce highly pure silicon materials which will have zones of uniform electrical characteristics.

Another object of the invention is to produce solid silicon of high purity having a characteristically striated structure.

Silicon has long been used as a contact rectifier for detection of electrical oscillations. Examples of such detectors are those of U. S. patents to G. W. Pickard 836,531, November 20, 1906, and 888,191, May 19, 1908. In an article at page 1003, Electrical World, November 24, 1906, Pickard states that after trial of a large number of elements of compounds, pure silicon was found very satisfactory as a rectifying contact detector. U. S. patent to Ballantine and Hull 1,698,668, January 8, 1929, refers to crystals of refined silicon. As a matter of fact the commercially "pure silicon" available to Pickard and the "refined silicon" available to Ballantine and Hull was a substance of about 98 per cent purity at most with at least 2 per cent of impurities. In recent years there has become available on the market silicon of a purity of the order of 99.5 per cent. This material may be obtained in powder or in granular form depending upon the method of producing it, but it is not available commercially in chunks of sufficient size to be useful for electrical purposes.

In researches with bodies of material prepared by fusing silicon powder or granules of high purity, that is, of the order of 99.5 per cent purity, R. S. Ohl discovered the presence in the resulting ingot of an internal barrier of the nature of a surface having remarkable current rectifying properties such that a slab of the material divided by the barrier into portions may constitute an alternating current rectifier if each portion be provided with an electric terminal. This is disclosed and claimed in the application of R. S. Ohl, Serial No. 381,273, filed March 1, 1941, for Alternating current rectifiers. Ohl also discovered that the silicon materials of the two portions separated by the barrier have unlike electrical properties, and that using metallic points in contact with their surfaces both are suitable for contact rectifiers of the general types disclosed in the Pickard patents. Ohl also discovered that the material of the portion which is last to solidify is particularly suitable for frequency converters such, for example, as the first stage detector of a receiving system for oscillations of centimeter or even millimeter wavelengths. This subject-matter is disclosed and claimed in the application of R. S. Ohl, Serial No. 385,425, filed March 27, 1941, for Electrical translating devices utilizing silicon.

The present invention is concerned with methods and apparatus for producing silicon bodies of high purity having the characteristic barrier surface. In accordance with the invention, in producing high purity silicon bodies by fusion of powder or granular material, the ingredients, the temperature to which they are raised, the atmospheric, and other chemical environmental factors, and the thermal treatment are so controlled that there results an ingot with a remarkably regular interior physical system comprising two zones of unlike materials separated by a barrier surface. The barrier surface is sufficiently regular to permit rectifying blocks bisected by the barrier to be made of any desired shape and size. The ingot as a whole is sufficiently uniform in physical structure, free from blow-holes and strong, to permit machining or cutting into blocks or slabs or even into very thin plates. This is in marked contrast to the commercial silicon which Pickard and Ballantine and Hull used. Moreover, the portions or zones into which the barrier surface divides the ingot are each sufficiently uniform in characteristics throughout the zone, except for a fairly regular change of resistivity with distance from the barrier, to enable contact rectifier units to be made which possess substantially identical rectifying characteristics throughout the particular zone.

In outline, the process of the present invention involves fusing highly pure silicon (i. e. of the order of 99 per cent silicon or higher) under non-contaminating conditions, raising the temperature of the fused material to a point well over 1500° C., say, 200° above the fusion temperature, or 1600° C., initiating solidification at a particular point, plane or region of the melt, and solidifying the remaining material in an orderly fashion proceeding from the initially solidified region and at a sufficiently slow rate of solidification to permit a characteristic columnar structure to develop as the solidification proceeds.

The invention in its various aspects and features as well as additional objects of the invention may be better understood by reference to the following detailed specification taken in connection with the accompanying drawings in which:

Fig. 9 is a graph illustrating the resistivity of a sample cut from a highly pure silicon ingot with its major axis transverse to the barrier zone; and Figs. 10, 11 and 12 indicate the rectifying properties, respectively, of ordinary commercial silicon, P zone silicon, and N zone silicon when used in cooperation with a metallic contact point as a contact rectifier.

Figure 1:
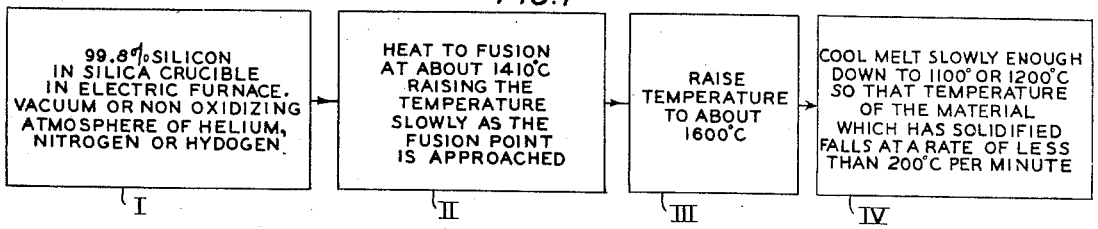
Fig. 1 is a diagram of one form which the process in accordance with the invention may take.

Referring to Fig. 1, the process of preparing the high purity silicon material begins with silicon in the form of small particles. Silicon in granular form of a purity of about 99.85 per cent is produced and distributed by the Electrometallurgical Company. This material passes through a 30 mesh screen but is retained on an 80 mesh screen. Processes for producing such granular silicon using an acid treatment have been described by Becket in his U. S. Patent 1,386,227 dated August 2, 1921. N. P. Tucker of the British National Physical Laboratory has described an alternative process in the Journal of Iron and Steel Institute, vol. 15, page 412, 1927. Eimer and Amend have also supplied highly pure silicon in powder form. The following table gives analyses of commercial silicon and of high purity silicon produced by the Tucker and the Electrometallurgical Company processes:

|  | Commercial silicon | Tucker process silicon | Electrometallurgical Company silicon lot 14743 |
| --- | --- | --- | --- |
|  | Per cent | Per cent | Per cent |
| Silicon | 98 | 99.95 | 99.85 |
| Carbon | .01 |  | .019 |
| Iron | .59 | .02 | .031 |
| Aluminum | .45 | .02 | .020 |
| Calcium | .80 | .009 | .003 |
| Manganese |  |  | .002 |
| Phosphorus |  |  | .011 |
| Magnesium | Nil |  | .007 |
| Oxygen |  |  | .061 |
| Hydrogen |  |  | .001 |
| Nitrogen |  |  | .008 |
| Insoluble | .06 | .006 |  |

Materials of lower purity than that of the Electrometallurgical Company material may be used but at around 99 per cent purity the barrier is weak.

Figure 3:
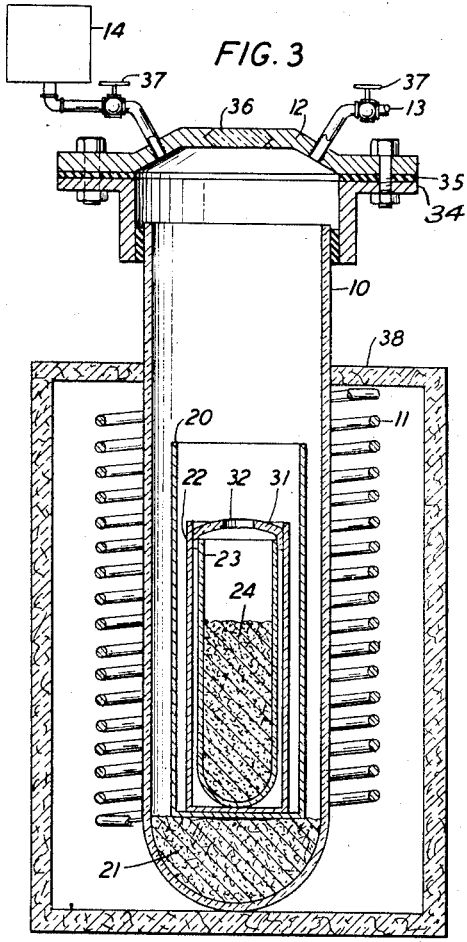
Fig. 3 shows in section an apparatus for fusing high purity silicon.

The fusion of silicon occurs at a temperature of approximately 1410°± 10° C. Since the granular silicon charge cannot readily be melted by "direct" induction because of its inherently high electrical resistance and the poor electrical contact between individual grains, an "indirect" induction method is used. One form of induction furnace used for this purpose and illustrated in Fig. 3 comprises a receptacle 10 in the form of a silica tube surrounded by a heating coil 11 carrying high frequency alternating current. There is also provided an iron cover 12 which serves to hermetically seal the furnace. The cover 12 is provided with a glass window 36 to permit inspection of the charge within the furnace during the fusion process. The cover is tightly sealed to a flanged iron collar 34 by a lead gasket 35 and is bolted to the collar as shown. The joint between the collar 34 and the tube 10 is packed with any suitable gas-tight cement. An exhaust system 13 is provided for removing the atmosphere within the furnace. A chamber 14 is also associated with the furnace for supplying an inert atmosphere thereto with the usual valves 37 to permit association of the exhaust system or the gas chamber 14 with the atmosphere of the interior of the furnace when desired.

Within the furnace is an alundum tube 20 seated upon a mass of aluminum oxide particles 21. Within the tube 20 is a graphite crucible 22 and within the crucible 22 is a silica crucible 23. The silicon granules or powder to be fused are placed within the silica crucible 23 as indicated at 24. A silica crucible cover 31, which is provided with a circular hole 32 through which the melting operation can be observed, fits closely over the crucible 23. In operation the heat generated by induced currents in the graphite crucible 22 is conducted through the silica crucible 23 to the charge 24. The outer alundum tube 20 serves to protect the wall 10 of the furnace from heat generated in the graphite crucible. It also serves to prevent material which may be erupted from the crucible 23 during the operation from being splashed into the furnace proper. The material 21 serves as an inert filler to maintain the members 20, 22 and 23 in the proper central position with reference to the furnace. An appropriate supporting housing 38 preferably of refractory or a heat insulating structure supports and encloses the heating coils 11 and the lower portion of the electric furnace.

Because of its chemical activity at high temperatures, silicon will react with most refractory oxides and even with oxygen and nitrogen in the ordinary atmosphere. Accordingly, the crucible 23 must be made of a material which will not readily react or alloy with the silicon. For this crucible, the most satisfactory material appears to be silica. Although it is less liable to react with the fused silicon than other materials it may react to some extent with the fused silicon to produce oxygen or silicon monoxide. Alundum (aluminum oxide) crucibles have not proved satisfactory for containing the charge to be fused as they did not produce ingots having the three zones. Magnesium oxide crucibles have also been tried but the reactions in fusion are so violent as to make them unusable.

When the silicon metal melts, a large quantity of gas is evolved and, in a high vacuum, even with slow heating, this action is so violent as to eject most of the metal from the crucible. Accordingly, although the vacuum method has been used for production of a satisfactory product it leaves much to be desired. This condition may be alleviated by several expedients. For example, the crucible may be made shallow and with a wide mouth as in the case of the crucible 25 of Fig. 4 in order to enable the gas to more readily escape without displacement of the melt. Moreover, the space within the furnace may, after exhaustion of the air, be filled with helium, nitrogen or hydrogen from the chamber 14. This reduces the difference between the internal gas pressure in the fused silicon and the external gas pressure of the atmosphere within the furnace, thus decreasing the violence of the gas evolution. Helium is preferred as it is inert and insoluble in silicon and accordingly produces a structure more free from blow-holes. Moreover, helium provides a good cooling action at the top of the melt that promotes solidification from the top down. Hydrogen is inert but has a strong tendency to produce blow-holes. Some degree of success has been had in fusion of high purity silicon in an atmosphere of ordinary air but it is to be remembered that the evolution of gas from the material occurs at a relatively high rate and may mask the effects of the initial atmosphere. An inert atmosphere has another advantage in that it protests the various crucibles and heating elements from oxidation.

Figure 4:
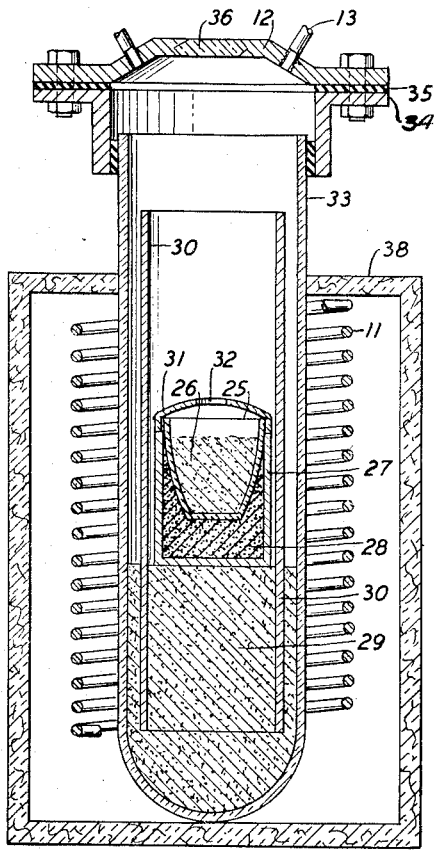
Fig. 4 shows a modification of the apparatus of Fig. 3.

In the apparatus of Fig. 4 the crucible 25 containing the charge 26 is held in position within the graphite crucible 27 by a bed 28 of silica powder. The crucible 27 is seated upon a second bed 29 of silica powder in which an alundum cylinder 30 is thrust sufficiently far to assure its being held firmly in position. In an actual apparatus the outer tube 33 was 4 inches in diameter and the crucible 25 about 2 inches in diameter. In other respects the apparatus of Fig. 4 is similar to that of Fig. 3.

In a typical melt using the apparatus of Fig. 4 the silica crucible 25 as used in a typical melt was of 50 centimeter capacity and of the so-called "high form" obtainable from Thermal Syndicate, Incorporated. Charges of 40 to 50 grams of silicon were employed. This shape of crucible was found particularly suitable for the development of an orderly columnar grain structure by initiating solidification at the top of the melt. The considerable mass of silica particles 28 surrounding the lower part of the crucible 25 imparts to the lower region of the crucible an increased thermal capacity so that the temperature of the lower part of the melt within the crucible is permitted to fall slowly after the upper part of the melt has lost sufficient heat to begin to solidify. Obviously any portion of the melt may be permitted to solidify first by causing the other portions to have greater thermal insulation and slower heat loss. It is convenient, however, from the standpoint of physical support of the crucible to make the portion of greatest heat retaining capacity the lower portion of the crucible as in Fig. 4, and to permit the top to cool first. However, it is entirely possible to reverse this order by increasing the heat insulation at the top and reducing that below so as to permit the bottom portion of the melt to solidify first as will be obvious to those skilled in the metallurgical art. This Fig. 4 structure also permits concentration of impurities in the narrow bottom part of the crucible inasmuch as this is the last region to solidify.

In the typical melt under consideration the power applied to heat the material was approximately 5 kilowatts for a period of five minutes. It was then raised to 10 kilowatts and maintained at that magnitude for an additional eleven minutes. When the material melted at the end of sixteen minutes heating, the power was immediately reduced to 7.5 kilowatts. Three minutes later it was reduced to 7 kilowatts and thereafter was lowered a half kilowatt each minute for a period of nine minutes, by which time the material had solidified. The power was all withdrawn a minute later but the whole thermal system had a sufficiently low conductivity to restrict the rate of temperature drop of any material already solidified to 100° C. per minute until a temperature around 1250° C. was attained. A diagram of the temperature and power conditions during this melt is given in Fig. 5. Temperatures were observed by means of a thermocouple immersed in the melt, the first reading being taken about two minutes after melting occurred. These temperatures are accordingly those of the central region at which the thermocouple is immersed and the temperatures of the upper and lower portions of the melt will be respectively cooler and hotter by amounts depending upon the rate at which the temperature is permitted to fall.

Figure 5:
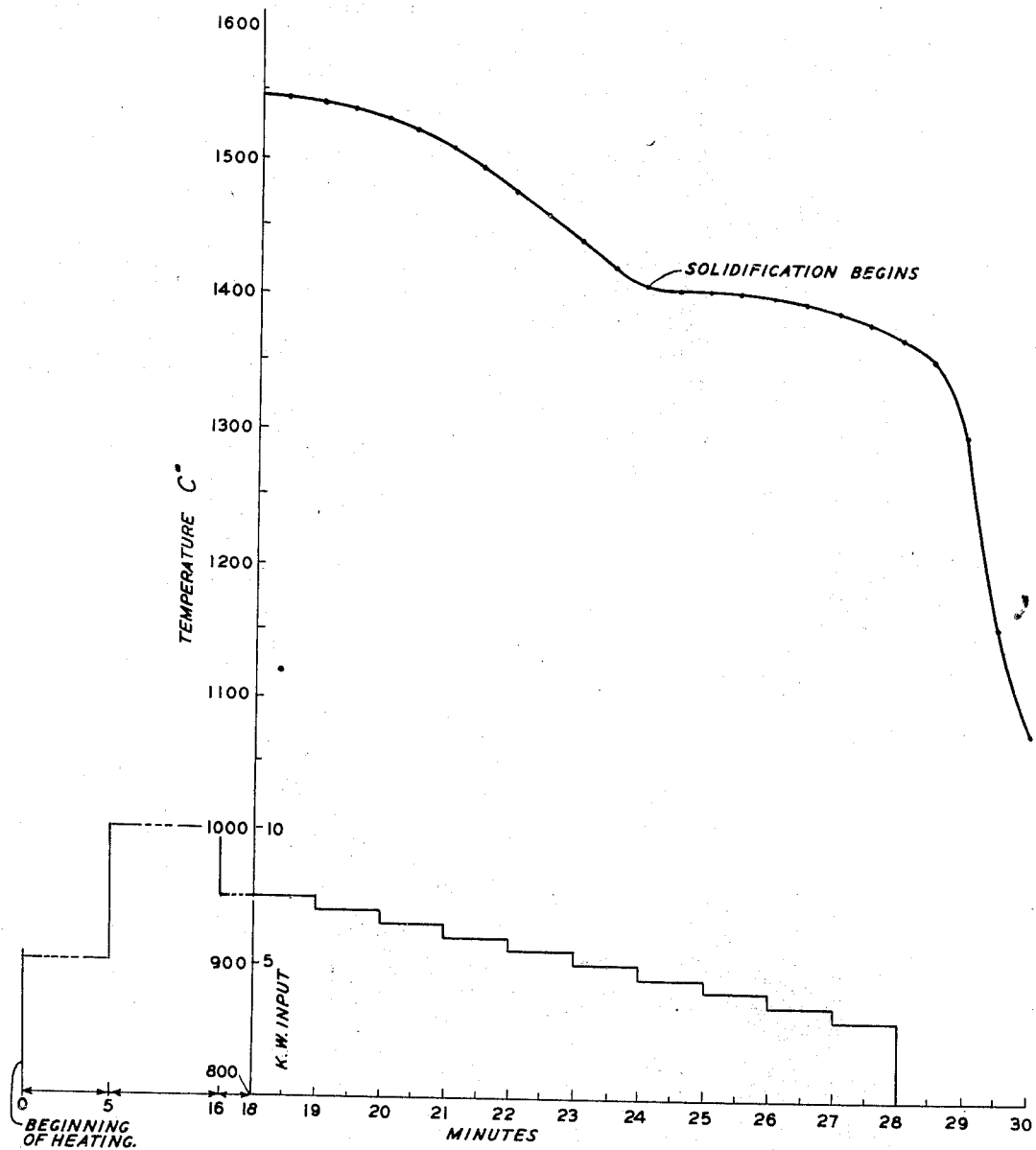
Fig. 5 is a diagram indicating the rate at which the fused material may be cooled.

Slow cooling, particularly during solidification, with solidification initiated at one point, plane or zone of the melt and proceeding in an orderly fashion toward a portion of the melt which remains fluid for a longer time is an important factor in developing in the silicon the most desirable physical characteristics. Control of the cooling rate in a manner which permits the metal to solidify slowly and then to cool towards room temperature at a rate of 150° C. per minute to a temperature considerably below solidification as, e. g. to 1100° C. or 1200° C. as shown in Fig. 5, gives excellent results. This corresponds to a rate of solidification which may be measured by the linear advance of the front of the solidified zone. This advance may be of the order of 1 centimeter per minute. Satisfactory results have also been obtained with slower rates which allow the metal to solidify in about ten minutes and then to cool towards room temperature at 50° C. per minute. This may be accomplished by following the same power schedule shown in Fig. 5 until the metal melts, reducing the power to 7.5 kilowatts and then lowering the power ½ kilowatt at intervals of two minutes. However, if the metal is caused to solidify in one-fourth the time shown in Fig. 5 and then to cool towards room temperature at a rate of 200° C. per minute, a conglomerate structure is obtained which is unsatisfactory. This latter rate is obtained by following the power schedule shown in Fig. 5 until the metal is liquid and then abruptly withdrawing all the power from the furnace. This will be considered in more detail in connection with the physical characteristics of the silicon ingot produced by the process of this invention.

During the melting, fumes are evolved which form a yellowish brown deposit on the cold parts of the crucible and on the furnace walls. As the silicon solidifies an extrusion of the melt through the top crust invariably occurs in the case of vacuum fusing and sometimes occurs in the helium melts. It is accompanied by stresses which frequently break the crucible.

Figure 6:
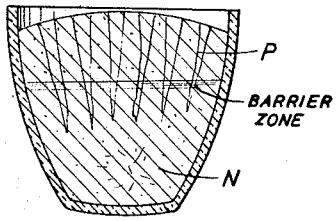
Fig. 6 illustrates diagrammatically the structural characteristics of a high purity silicon ingot prepared in accordance with this invention.

The resulting ingot is represented in section in Fig. 6. It is not structurally homogeneous but consists of three well-defined zones. The upper portion which is first to solidify develops a positive thermal electromotive force against copper. If a metallic point be placed in contact with the upper portion the combination is highly asymmetrically conducting for electric current and the direction of easy electron flow is from the metal point to the silicon, in other words, when the silicon is at a positive potential with respect to the metal point. This zone of the ingot first to solidify will be designated the P zone. It appears to consist of a columnar grain formation extending well down into the ingot. The columnar grains may be one-half millimeter in width and 5 to 10 millimeters long. If the cooling be at a slower rate the columnar grains formed will be still longer.

The lower portion of the ingot which is last to cool develops a negative thermal electromotive force against copper. When in contact with a metal point the easy direction of electron flow is from the silicon to the point. Accordingly, since this zone of the ingot should be negative for most easy current flow it will be designated as the N zone. Between the P and N zones is a very thin barrier layer, sometimes a plurality of such layers closely spaced and extending across the ingot as a whole. The barrier zone is in effect a separating surface on one side of which the material has P zone characteristics and on the other side of which the material has N zone characteristics. However, the columnar structure characteristic of the P zone extends down through the barrier and into the N zone. The barrier zone divides the ingot into the P zone on the one side and the N zone on the other, and, therefore, passes entirely through the crystal aggregates which constitute the columnar structure extending down into the N zone. In that portion of the N zone beyond the columnar structure tiny gas occlusion pits occur, and other impurities which appear to have separated from the liquid metal during solidification are found as a second phase. When this zone is sectioned, there is a distinct acetylene-like odor.

The structure of silicon fused in accordance with the process of this invention is revealed by microscopic examination in the unetched state and after etching with various reagents. In the unetched state, the upper part of the melt which is the first part to solidify appears to be homogeneous. In the lower part of the melt, the last region to solidify, numerous pits or gas holes are found as well as clusters of hard, grey inclusions irregularly distributed and a white phase which is concentrated in the grain boundaries. The location of the white phase indicates that it has a melting point lower than that of silicon and also that it solidifies after the silicon grains have assumed their final form.

Figure 7:
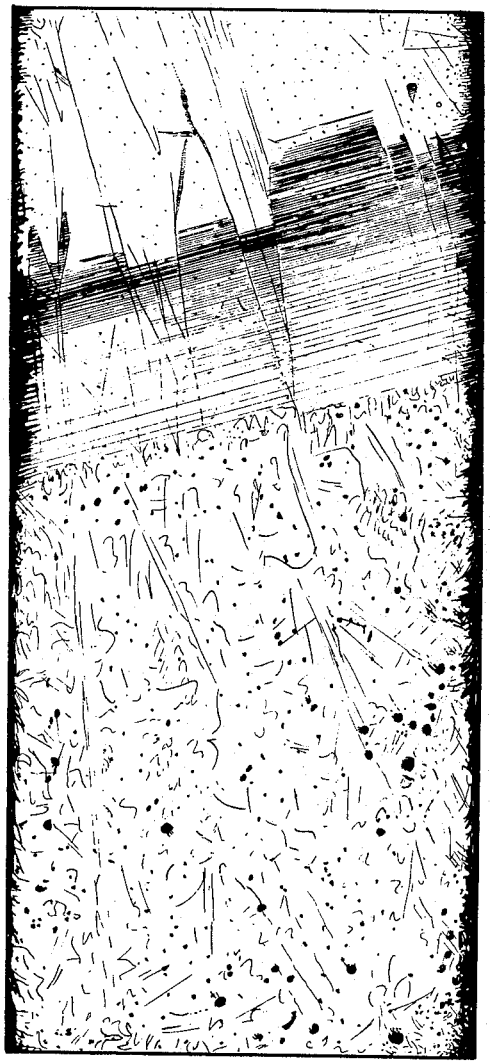
Figs. 7 and 8 are microphotographic showings of a section of the highly pure silicon ingot of Fig. 6.

Fig. 7 shows the appearance of a highly polished vertical section of the ingot of Fig. 6 at a magnification of fourteen diameters. This section was immersed for approximately three minutes in an etchant consisting of 98 per cent concentrated nitric acid and 2 per cent hydrofluoric acid. In the P zone, the first part of the melt to solidify, a series of roughly parallel striations may be found. At the junction of the P and N zone materials, the barrier layer, the striations are more strongly revealed by the etchant. The intensity of the striations diminishes in the N zone with increasing distance from the barrier. The orderly striations continue with decreasing intensity throughout the columnar portion of the N zone but abruptly disappear at the junction of the non-columnar and the columnar region. Below the columnar structure the pits and white phase which have hitherto been mentioned are to be found. In general, the striations just below the barrier at low magnifications appear rather sharply defined and are seen to have a slight curvature within the grain proper and do not change direction abruptly at the grain boundaries. At higher magnifications the striations have a diffused appearance rather than that of sharply defined lines. The striations roughly follow the curved contour of the surface of the melt.

The acid etchant attacks the P zone and the N zone silicon at different rates. At high magnification this is revealed by a difference in height of the P zone and N zone materials at their junction. Usually the N zone material is less strongly attacked than the P zone material and hence the N zone will appear to be slightly higher than the P zone. The acid etchant also strongly attacks the white phase in the non-columnar region and dissolves it.

The grain structure is not well revealed by the acid etchant but is clearly revealed by etching with a warm 10 per cent potassium hydroxide solution. The caustic etchant does not attack the P zone and N zone materials differently and hence it will not reveal the barrier or the regularly spaced striations. The caustic element also does not dissolve the white phase.

Figure 8:

Fig. 8 shows the appearance of the specimen of Fig. 7 with a magnification of five diameters after the acid etching to bring out the striations and to differentiate the P and N zones has been followed by a final staining with potassium hydroxide to emphasize the grain boundaries. It will be observed that Fig. 8 shows a greater length of the P zone structure a portion of which is omitted from Fig. 7 because of its larger scale.

The electrical resistance of the three zones, P, N, and barrier, of a typical ingot is portrayed in Fig. 9. The measurements were made upon a rectangular prism shown in Fig. 9 7.3 millimeters by 6.5 millimeters by 19.1 millimeters cut from the top of a helium melt ingot so that the region with the columnar structure was located at the top of the prism and the non-columnar structure at the bottom of the specimen. The barrier crosses the specimen in a roughly horizontal direction approximately 6 millimeters from its top. The resistance as indicated on a logarithmic scale in Fig. 9 is measured in a direction parallel to the barrier sheet. The resistivity of the material first to solidify, that is, of the P zone, is moderately high. As indicated in Fig. 9 the resistance may range from a magnitude of 70 ohms at its upper surface through a rapidly rising magnitude as it approaches the barrier zone. In the barrier zone resistivity is very high and may increase to a magnitude ten to twenty times that of the material first to solidify. Farther down in the barrier zone the resistivity falls precipitately to a value somewhat below that of the top zone. The resistivity of the N zone is about one-tenth that of the first material to solidify.

Measurements were also made on end-to-end resistance of the specimen with flat metal contacts at each end. In one direction, the resistance of the specimen was found to be 2.7 ohms when 3 volts was applied. After reversal of direction of the same electromotive force the resistance was found to be 1870 ohms. This corresponds to a front-to-back resistance ratio of about 690. It is this property which is a function primarily of the barrier surface within the specimen which makes possible the barrier rectifier of R. S. Ohl application Serial No. 381,273 to which reference has previously been made.

For contact detector purposes the rectifying properties of a piece of the silicon material cooperating with the metallic point contact are of interest. Fig. 10 shows the rectifying characteristic of commercial silicon with metallic point contact. It is definitely asymmetric but as the electromotive force increases above zero, current soon passes in both directions and the relative increase in power of the rectified current with increase in alternating electromotive force is small. The P zone rectifier, the performance of which is illustrated in Fig. 11, requires considerable electromotive force before any response is obtained in the positive direction. However, the current begins to flow at a relatively low electromotive force in the negative direction and increases rapidly for a considerable range of electromotive forces before the current in the opposite direction becomes significant. This type of rectifier is especially suitable for measuring equipment such as voltmeters.

The N zone rectifier as is shown by Fig. 12 passes current for a positive electromotive force at a relatively small voltage, and up to the point where substantial current flows in response to a negative electromotive force is a very effective rectifier. As it is sensitive and of low resistance it is particularly useful as the rectifier element of a first or high frequency stage detector.

If the process outlined in Fig. 1 is followed except for the slow cooling during solidification of the fused material, or in other words if the melt be immediately chilled, the continuous barrier surface is not produced. In the case of rapid cooling those points at which solidification first occurs, distributed irregularly through the material, become the nuclei of P zones. They grow in an irregular manner as the material solidifies and are surrounded by barrier surfaces which are correspondingly irregular. Outside of these barrier surfaces may be matrices of N zone material. The resulting ingot is accordingly a conglomerate or disorderly mixture of P zone and N zone material. It is obviously not useful for barrier rectification. It is, moreover, not very satisfactory for contact rectifier detectors, for a given unit may turn out to have a surface of either type or partly of each type, thus making its performance quite unpredictable. As the resistivity of the material depends upon distance from the barrier it will be necessary to test each individual unit to be sure that it is suitable and to select from a large number those few which may be found to meet the required standards. This is in very great contrast to the material produced by applicant's method which is so regular that it may be readily used for barrier rectifiers of whatever sectional area or current carrying capacity is desired. Moreover, P zone or N zone detectors may be fashioned from ingots of the material produced in accordance with applicant's invention with the assurance that each unit in a given layer of material will exhibit characteristics substantially identical with those of the other units cut from the same layer. The material is also strong, and workable by cutting or grinding. Small elements could not be cut or ground from previously known silicon since it shatters if subjected to much stress. Silicon produced in accordance with applicant's invention is so free from blow-holes that it may be given a high polish, and very stiff, hard, small area points may bear against it with considerable pressure with no danger of scratching or gouging it.

In addition to the remarkable asymmetric conductivity the barrier surface has been found by Mr. Ohl to possess very unusual photoelectric and thermoelectric properties. The photoelectric properties are disclosed in detail in the application of R. S. Ohl, Serial No. 395,410, filed May 27, 1941, for Light sensitive electric device, directed to this subject-matter. The barrier surface also possesses certain useful thermoelectric properties which form the basis of the subject-matter of R. S. Ohl application Serial No. 438,645, filed April 11, 1942, for Thermoelectric device.

Figure 2:
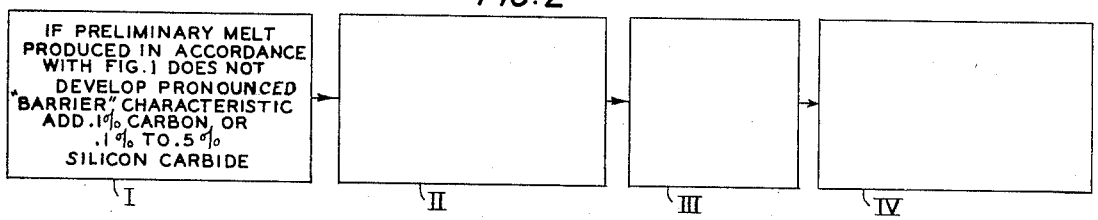
Fig. 2 illustrates a modification of the process of Fig. 1.

The nature of the boundary surface and the reasons for its electrical, photoelectric, and thermoelectric behavior are obscure. There is evidence to indicate that the observed phenomena while present in properly produced ingots of high purity silicon, that is, of 99 per cent or higher, are influenced by the character of the extremely small amounts of impurities which remain. In the most satisfactory ingots the N zones, when cut, as has been noted, exhibit very tiny gas pockets and a characteristic odor similar to that of acetylene. Certain lots of highly pure silicon which did not yield the acetylene odor were found to be defective in barrier forming properties. Applicant discovered that the material of these lots could be suitably "conditioned" by the introduction of silicon carbide into the melt in amounts of the order of .1 per cent to .5 per cent. As an alternative, carbon may be added to the melt in quantities of approximately .1 per cent. It may be conveniently added in the form of graphite particles. This modification of the process of Fig. 1 is indicated in the diagram of Fig. 2 which is intended to represent a process which in other respects is identical with that of Fig. 1. When, therefore, it is found that a preliminary sample melt of high purity silicon does not yield the characteristic barrier structure the material should be conditioned in accordance with the process of Fig. 2.

What is claimed is:

1. The process which comprises adding to silicon of a purity of the order of 99.8 per cent a substance which will introduce carbon in an amount of the order of .1 per cent of the whole, fusing the material, raising its temperature substantially above the fusion point and cooling the material from the beginning of its solidification until it has all solidified so that solidified material drops in temperature at a rate of the order of 100° C. per minute to cause it to solidify in an orderly manner.

2. The process of claim 1 characterized in this that the process is carried out in a silica container for the silicon material.

3. The process of claim 1 characterized in this that the atmospheric environment of the silicon during fusion and cooling to solidification is controlled to prevent deleterious reactions.

4. The process of claim 1 characterized in this that the added substance is silicon carbide.

5. The process of claim 1 characterized in this that the added substance is silicon carbide in a quantity of the order of .1 per cent to .5 per cent of the whole mass.

6. The process which comprises adding to silicon of a purity of the order of 99.8 per cent, a substance which will introduce carbon in an amount of the order of 0.1 per cent of the whole, fusing the material, raising the temperature of the molten mass to a temperature substantially above the fusion point and cooling the material slowly enough to produce a resultant ingot having two zones of materials of different characteristics separated by a roughly horizontal barrier layer having highly asymmetric electrical conductivity.

7. The process which comprises adding to silicon of a purity of the order of 99.8 per cent, a substance which will introduce carbon in an amount of the order of 0.1 per cent of the whole, fusing the material and cooling the material slowly enough to produce a resultant ingot having two zones of materials of different characteristics separated by a roughly horizontal barrier layer having highly asymmetric electrical conductivity.

8. The process which comprises adding to silicon of a purity of the order of 99.8 per cent a substance which will introduce carbon in an amount of the order of 0.1 per cent of the whole, fusing the material, raising the temperature substantially above the fusion point, cooling the mass and initiating solidification at one point, plane or zone, solidifying the mass at a controlled rate until an appreciable proportion of the mass is composed of columnar grains and subsequently cooling to room temperature.

9. The process of claim 8 in which the solidified metal is subsequently cooled at least to 1100° C. at a rate of less than 200° C. per minute.

10. The process which comprises fusing silicon of in excess of 99 per cent purity and cooling the fused material sufficiently slowly that the front of the solidified material advances at a rate of the order of 1 centimeter per second.

11. The method which comprises applying a source of heating energy to fuse a quantity of silicon of a purity of at least 99 per cent, controlling the application of said energy to cause the cooling of the fused silicon mass to a point near the temperature of solidification, causing said mass to solidify into an ingot comprising two zones of material, each uniform throughout in its electrical characteristic and opposite in characteristic to that of the other zone, by controlling the application of said source during the interval of solidification to cause the dissipation of heat from said mass at a rate which is less than the rate of dissipation when said heating source is fully removed, and cooling said ingot to a predetermined temperature.

12. The method which comprises applying a source of heating energy to fuse a quantity of silicon of a purity of at least 99 per cent, controlling the application of said energy to cause the cooling of the fused silicon mass to a point near the temperature of solidification, causing said mass to solidify into an ingot having two distinctly separate solid zones of material, each uniform in its electrical characteristic and different in characteristic from that of the other zone, by controlling the application of said source during the interval of solidification to cause the dissipation of heat from said mass at a rate which is less than the rate of dissipation when said heating source is fully removed, and cooling said ingot to a predetermined temperature.

13. The method which comprises applying a source of heating energy to fuse a quantity of silicon of a purity of at least 99 per cent, controlling the application of said energy to cause the cooling of the fused silicon mass to a point near the temperature of solidification, causing said mass to solidify into an ingot comprised substantially entirely of two separate solid zones of material, each uniform in its electrical characteristic and different in characteristic from that of the other zone, by controlling the application of said source of energy during the interval of solidification to cause the dissipation of heat from said mass at a rate less than the rate of dissipation when said heating source is fully removed, and cooling said ingot to a predetermined lower temperature.

14. The method which comprises applying a source of heating energy to fuse a quantity of silicon of a purity of at least 99 per cent, controlling the application of said energy to cause the cooling of the fused silicon mass to a point near the temperature of solidification, causing said mass to solidify into an ingot having two large separate zones of material of positive and negative electrical properties respectively and a small zone of neutral material, the material in each of said zones being uniform throughout, by controlling the application of said source during the interval of solidification to cause the dissipation of heat from said mass at a rate which is less than the rate of dissipation when said heating source is fully removed, and cooling said ingot to a predetermined temperature.

15. The method of producing an ingot of silicon of high rectifying power having zones of different electrical characteristics separated by an internal barrier surface which comprises fusing a mass of silicon of a purity of at least 99 per cent, allowing the mass to cool to a point slightly above the temperature at which solidification begins, supplying heat to the mass during further cooling and solidification to lessen the dissipation of heat therefrom so that solidification begins at one place in the mass and progresses uniformly and substantially unidirectionally through the mass, and cooling the solidified mass to ordinary temperatures so that an ingot of the above-described characteristics is produced.

JACK H. SCAFF.